United States Patent
Nordström

(10) Patent No.: US 9,914,037 B2
(45) Date of Patent: Mar. 13, 2018

(54) METHOD AND DEVICE FOR PROVIDING GUIDING FOR EXECUTING A GOLF SWING

(71) Applicant: Mats Nordström, Torslanda (SE)

(72) Inventor: Mats Nordström, Torslanda (SE)

( * ) Notice: Subject to any disclaimer, the term of this patent is extended or adjusted under 35 U.S.C. 154(b) by 0 days.

(21) Appl. No.: 15/517,222

(22) PCT Filed: Oct. 23, 2015

(86) PCT No.: PCT/SE2015/051128
§ 371 (c)(1),
(2) Date: Apr. 6, 2017

(87) PCT Pub. No.: WO2016/010476
PCT Pub. Date: Jan. 21, 2016

(65) Prior Publication Data
US 2018/0036621 A1 Feb. 8, 2018

(30) Foreign Application Priority Data

Oct. 28, 2014 (SE) ........................................ 1451286
Mar. 16, 2015 (SE) ........................................ 1550314

(51) Int. Cl.
*A63B 69/36* (2006.01)
*G02B 27/01* (2006.01)
*G06K 9/00* (2006.01)
*A63B 71/06* (2006.01)

(52) U.S. Cl.
CPC .......... *A63B 69/36* (2013.01); *A63B 69/3667* (2013.01); *A63B 71/0622* (2013.01); *G02B 27/0172* (2013.01); *A63B 2069/367* (2013.01); *A63B 2071/0625* (2013.01); *A63B 2071/0638* (2013.01); *A63B 2071/0655* (2013.01); *A63B 2071/0666* (2013.01); *A63B 2071/0694* (2013.01); *A63B 2220/12* (2013.01); *A63B 2220/20* (2013.01); *A63B 2220/40* (2013.01); *A63B 2220/802* (2013.01); *A63B 2220/806* (2013.01); *A63B 2225/50* (2013.01); *G02B 2027/0141* (2013.01); *G02B 2027/0178* (2013.01); *G06K 9/00671* (2013.01)

(58) Field of Classification Search
USPC ................ 473/209, 210, 215, 218, 220, 409
See application file for complete search history.

(56) References Cited

U.S. PATENT DOCUMENTS 4,531,743 A * 7/1985 Lott .................... A63B 69/3608
351/158
5,413,346 A * 5/1995 Hedlund ............ A63B 69/3608
351/51

(Continued)

OTHER PUBLICATIONS

Notification of Transmittal of the International Search Report and the Written Opinion of the International Searching Authority from PCT/SE2015/051128, dated Feb. 16, 2016.

*Primary Examiner* — Nini Legesse
(74) *Attorney, Agent, or Firm* — Westman, Champlin & Koehler, P.A.

(57) ABSTRACT

The present invention is related to a method and to a device for providing guiding to a user for executing a golf swing with a golf club on a golf ball towards a target, said method being implemented in an electronic device comprising a display in communication with a control unit, said display being placed in the line-of-sight of the user.

43 Claims, 14 Drawing Sheets

(56) References Cited

U.S. PATENT DOCUMENTS

| | | | |
|---|---|---|---|
| 5,489,953 A * | 2/1996 | Griffith | A63B 69/3608 351/158 |
| 5,560,607 A * | 10/1996 | Macroglou | A63B 69/3608 33/370 |
| 5,879,239 A * | 3/1999 | Macroglou | A63B 69/3608 473/209 |
| 6,558,266 B2 * | 5/2003 | McMahon | A63B 69/3608 33/262 |
| 2002/0137571 A1 | 9/2002 | McMahon | |
| 2008/0090679 A1 | 4/2008 | Browne et al. | |
| 2009/0213038 A1 | 8/2009 | Huang et al. | |
| 2012/0295739 A1 | 11/2012 | Young | |
| 2013/0172093 A1 | 7/2013 | Leech | |

* cited by examiner

METHOD AND DEVICE FOR PROVIDING GUIDING FOR EXECUTING A GOLF SWING

CROSS-REFERENCE TO RELATED APPLICATION

This Application is a Section 371 National Stage Application of International Application No. PCT/SE2015/051128, filed Oct. 23, 2015 and published as WO 2016/010476 on Jan. 21, 2016, in English, which claims priority to Swedish Application No. 1451286-7, filed Oct. 28, 2014 and Swedish Patent Application No. 1550314-7, filed Mar. 16, 2015, the contents of which are hereby incorporated by reference in their entirety.

FIELD OF THE INVENTION

The present invention relates to method and a device for providing guiding to a user for executing a golf swing with a golf club on a golf ball towards a target.

BACKGROUND OF THE INVENTION

Practitioners of sports worldwide typically all have a desire to improve their skills. The competitiveness is as charming as it is challenging and drives not only the common practitioner but also the elite athletes further in their abilities as time goes and equipment improves. Moreover, science has recently been more and more involved in the development of sports equipment both in execution of sports and in equipment development.

Golf is one sport in which recent substantial technical development has improved the game and the skills of the practitioners. For example, the development of golf clubs is supported by substantial finances, and the development has indeed improved the game. The interest in golf has increased over the past decades. It has in many countries become a common sport for people, and they play varying amounts of rounds each year. Golf is a sport of high skills where improvement lies in the details. A typical development of skills for a player is limited to the practice areas at a golf club, and also to classes given by professional instructors who also charge a fair amount for a class.

On the golf course, there exist some tools for guiding a player through-out a golf round. For example, there are devices having GPS supported maps indicating the present course outline including its obstacles. Another example is the iCaddy which guides the user as an electronic caddy which may suggest club choice and provide information for a user regarding the present golf course. However, these devices may not provide the user with satisfactory instructions for improving the skills of the player on the golf course.

US patent application 2012/0295739 presents a machine and method used to capture, analyze, score, archive, track and communicate real-time relevant golf data specific to individual golfers: 1) during practice/lessons; or 2) for every shot on every hole of an entire recreational golf round; and 3) archive all such practice sessions or rounds during which the invention is in use. The apparatus uses measurements from several sensors placed in e.g. the shoes, clubs, golf balls, and garments of the golfer. Further, it is described that the correct position during parts of the golf swing may be determined and stored from these several sensors. Red, yellow or green lights may be presented in smart glasses or the like for indicating to the golfer that he or she is or is not standing in a correct position before swinging a golf club, that the swing is or is not correct during backswing through the top of the backswing down to ball impact. The golfer may also be provided with a target line towards the target, e.g. the hole of the current golf course. In summary, the apparatus disclosed in US patent application 2012/0295739 is complex, expensive, and requires the user to invest in several components having sensors such as shoes, clubs, golf balls, and garments. Hence, the set-up of the apparatus is tedious and/or time-consuming as a user has to check whether their current shoes, clubs, golf balls or garment, are interoperable with the apparatus.

Thus, it would be desirable to provide an improved device for providing a user with instructions for improving the skills of the player on the golf course in a cost-efficient way.

SUMMARY OF THE INVENTION

In view of the above-mentioned and other drawbacks of the prior art, a general object of the present invention is to provide an improved method and a corresponding device which provides guiding for a user to improve the golf skills of the user.

According to a first aspect of the present invention there is provided a method for providing guiding to a user for executing a golf swing with a golf club on a golf ball towards a target, the method being implemented in an electronic device comprising an optically transmissive display in communication with a control unit, the optically transmissive display being placed in the line-of-sight of the user, wherein the method comprises the steps of:

identifying a location of the golf ball;

determining a desired target direction for the golf ball;

based on the desired target direction, determining a desired trajectory of the golf ball caused by an impact between the golf club and the golf ball; and displaying at least one visual guiding element in the optically transmissive display when the location of the golf ball is in the line-of-sight of the optically transmissive display, wherein the at least one visual guiding element is based on the desired target direction, and the desired trajectory, wherein a first visual guiding element of the at least one visual guiding element provides guidance for a trajectory of the swing of the golf club, and a first indicator provides guidance for the golf club head orientation with respect to the golf ball at impact.

According to the invention, the desired target direction is the direction pointing towards a desired final location (i.e. the target) of the golf ball as a result of a golf shot. The final location is the location of the ball at rest after the shot, i.e. the target.

Furthermore, the desired trajectory is the flight path of the golf ball which is desired by the golf player, or suggested by the control unit.

The at least one visual guiding element is displayed in the display such that the at least one visual guiding element is visible for a user at the same time as e.g. the golf ball. In other words, the at least one visual guiding element is overlay with the visible field of view through the display.

The at least one visual guiding element is used for guiding the user to perform a golf swing towards the golf ball. Thus, the user is meant to swing the golf club, preferably the club head such that the trajectory of the club head follows the first visual guiding element. Furthermore, there is a first indicator which provides guidance for the orientation of the club head with respect to the golf ball. The orientation of the club head may be angle of the club head with respect to a portion of the first visual guiding element. Alternatively, the orientation of the club head may be angle of the club head with respect to the desired target direction. The first indicator provides an indication to the user when the club head orientation is correct.

Naturally, the invention works equally well for left handed players as for right handed players.

Optically transmissive may be e.g. transparent, semi-transparent, translucent, or combinations thereof. Thus, the display is optically transmissive in a way such that the user may see the golf ball through the display. Furthermore, the visual guiding element or visual guiding elements may also be transparent or at least semi-transparent so that a user may see at least partly through the visual guiding element.

The present invention is based on the realization that predetermined data regarding a golf swing and the result (the golf shot) of the golf swing may be used efficiently on the golf course using a displayed image for guiding the player to perform the golf shot. Thus, it is realized that the predetermined data may provide accurate information for instructing the player before and during the golf swing. In addition, the player may compare the result of a performed golf shot with e.g. the desired target direction or the desired trajectory. The invention thus provides an efficient tool for training and practice for a golf player which may be carried through-out a round of golf, or on the training/practice field (e.g. driving range).

The visual guiding element may advantageously comprise a guiding line providing guiding for a trajectory of the swing of the golf club. Note that the guiding line may be in the form of a discontinuous line and is not limited to a solid line. For example, the guiding line may be dotted, dashed, or similar, or may constitute separated guiding marks.

The first indicator may be a second guiding line being displayed in the optically transmissive display, a visual indicator, an audio indicator, or a haptic indicator. Thus, in a manner similar to the visual guiding element, the first indicator may be a visual guiding line, in this case a second guiding line. However, the first indicator may be a visual indicator other than a guiding line. For example, a visual indicator may provide a visual signal when the club head is in the correct orientation, by for example flashing with a predetermined frequency, or by changing color, by stop/begin flashing, etc. The audio indicator may provide a sound signal (e.g. a beep, or a certain frequency audio pulses, etc.) when the club head is in the correct orientation. The haptic indicator may provide a mechanical vibration when the club head is in the correct orientation. Thus the haptic indicator may be a vibration indicator. The first indicator may also be a combination of a visual indicator, and/or an audio indicator, and/or a haptic indicator.

In one embodiment of the invention, the guiding lines are displayed such that they are fixed in relation to the location of the golf ball. In other words, even if the user moves the display with respect to the golf ball, the guiding lines are locked in the display to the location of the golf ball. This way, a user may more easily focus on the guiding lines since they are fixed in relation to the location of the golf ball in the display.

Alternatively, the displayed guiding lines may be brought to the ball by the user by moving the display such that the guiding lines are projected at the location of the golf ball in the display.

In a further embodiment, the method may further comprise displaying a third guiding line providing an indication of the direction towards the desired target. This way, as the user is facing the display towards the golf ball, i.e. the user is looking towards the golf ball; the third guiding line provides an indication of the direction towards the desired target. The desired target is the desired location for the golf ball after the golf shot, in other words when the golf ball has stopped its motion and is set at rest.

According to an embodiment of the invention, the guiding lines are further determined based on predetermined data, the predetermined data being based on previously performed golf shots. In order to determine the guiding lines and/or indicator, previously collected data related to previously performed golf shots are used. For example, a programmed robot (or simulator) which may accurately perform golf shots following certain swing lines and club head orientations may be used to collect statistical data to be used as the predetermined data. In this way, accurate data may be obtained for efficiently determining the guiding lines and/or indicators to be displayed in the display. Thus, starting from the desired target direction, and the desired trajectory, at least one guiding line and indicator are determined from the statistical data. The predetermined data thus contains the data related to the trajectories and result of a plurality of golf shots.

Furthermore, the method may further comprise providing information regarding golf club choice, wherein the guiding lines are further based on the golf club choice. In other words, the at least one guiding line and indicator may also be determined based on input regarding the club choice. The club choice may be e.g. iron 1-9, pitching wedge, sand wedge, hybrids, driver, woods, etc. Naturally, the predetermined data may thus be based also on the club choice. Moreover, the user may have previously input information regarding e.g. the typical distance of a golf shot to expect from the user with a certain club. For example, the user may typically reach 150 meters (164 yards) with a 6 iron, which information may be known by the device running the method. Furthermore, the club choice may be a suggestion from the electronic device.

The electronic device may store information regarding the distance of golf shots performed with different clubs and alternatively with different settings of the visual guiding element and the indicator for the club head orientation, or wind conditions. For example, by knowing the location of the golf ball at a first location from which a first golf shot is executed and the location of the next golf shot, the distance between the locations will provide information regarding the distance of the golf shot. Moreover, the user may edit the stored information regarding the distance of the golf shots with different golf clubs.

Furthermore, the method may comprise to receive information regarding wind strength and wind direction, wherein the desired trajectory depends on the information regarding wind strength and wind direction. In other words, the desired trajectory may compensate for the wind conditions on the golf course which in turn may affect e.g. the visual guiding element and/or the first indicator for the club head orientation. The information regarding wind strength and wind direction may be provided by the control unit or as an input by the user.

Moreover, the method may further comprise providing information regarding a desired golf shot/stroke characteristic. Such characteristic may be e.g. fade or a draw type of golf shot (or e.g. pull-draw, pull, pull-fade, straight-draw, straight, straight-fade, push-draw, push, push-fade, pull-hook, push-hook, hook, slice, pull-slice, or push-slice). For example, a "draw" is a golf shot resulting in a golf ball trajectory (i.e. flight path) which the ball turns right-to-left for a right handed player, or left-to-right for a left handed player. A "fade" is the opposite to a draw, i.e. left-to-right for a right handed player, or right-to-left for a left handed player.

According to one embodiment of the invention, the desired trajectory of the golf ball determined by the control unit is provided from the control unit to the user based on predetermined knowledge regarding the present golf course topology stored in the control unit. For example, maps of the present golf course may be used for obtaining information regarding where obstacles such as bunkers, water, trees, etc is/are located and a desired trajectory may be determined such as to avoid the obstacles. Furthermore, the golf course topology may describe e.g. an uphill or downhill slope.

In yet another embodiment, determining the desired target direction comprises determining a compass heading between the location of the golf ball and the desired target. The compass heading may for example be shown in the display. A compass heading is a direction which may be shown on a "ruler" in the display.

Furthermore, determining the desired trajectory of the golf ball may comprise determining a compass heading between the location of the golf ball and a tangent of the desired trajectory. The tangent may be from an initial portion of the desired trajectory which may be adjacent to the location of the golf ball.

It may be advantageous to store the location of the golf ball as a first coordinate in the control unit. For example, this way, in the case of the desired trajectory being fixed to the location of the golf ball, the desired trajectory may be shown even without the golf ball being visible through the display.

According to an embodiment of the invention, the method may further comprise displaying an artificial object in the optically transmissive display, wherein the guiding lines are further determined based on the location of the artificial object. The artificial object may for example be an artificial target which the user (i.e. the player) may try and hit with the golf ball. The artificial object may alternatively be an artificial obstacle that the user should try and avoid to hit with the golf ball. The location of the artificial object may be determined by a global positioning system. With the artificial object a practice session for the golf player may be more efficient.

Furthermore, the method may further comprise displaying feet guiding elements for guiding the user to position his/her feet in desired positions, the feet guiding elements being based on the desired target direction, and the desired trajectory. The guiding elements may for example be in the form of lines (solid, dashed, etc.). The guiding elements help the player to place his/her feet correctly in order to execute a golf shot.

The feet guiding elements may further be based on the user's measures and chosen golf club.

The method may be implemented in electronic glasses or lenses or a visor.

According to a second aspect of the invention, there is provided an electronic device for providing guiding to a user for executing a golf swing with a golf club on a golf ball towards a target, the electronic device being in communication with a control unit and comprises an optically transmissive display, the optically transmissive display being placed in the line-of-sight of the user, wherein the control unit is configured to:
 identify a location of the golf ball;
 determine a desired target direction for the golf ball;
 based on the desired target direction, determining a desired trajectory of the golf ball caused by an impact between the golf club and the golf ball; and
 display at least one visual guiding element in the optically transmissive display when the location of the golf ball is in the line-of-sight of the optically transmissive display,
 wherein the at least one visual guiding element is based on the desired target direction, and the desired trajectory, wherein a first visual guiding element provides guidance for a trajectory of the swing of the golf club, and a first indicator provides guidance for the golf club head orientation with respect to the golf ball at impact.

The control unit may be a processor arranged to communicate wirelessly with the optically transmissive display. For example, the control unit may be the control unit of a mobile phone or another hand-held electronic device.

The first visual guiding element may provide guidance for a trajectory of the swing of the golf club.

The electronic device may comprise electronic glasses or electronic lenses or an electronic visor. Thus, the methods according to the first aspect and the related embodiments may be implemented in the electronic device.

The user may communicate with the electronic device by oral communication, by moving a body part (e.g. nod, instruction with the hands/fingers), point with the golf club, or via a handheld device such as a mobile phone or another mobile electronic device. Thus, image, voice, or motion recognition may be implemented in the electronic device.

The control unit of the electronic device may be configured to perform any of the steps of the previous aspects and embodiments.

Further effects and features of this second aspect of the present invention are largely analogous to those described above in connection with the first aspect of the invention.

According to a third aspect of the invention, there is provided a method for providing guiding to a user executing a golf swing with a golf club on a golf ball towards a target, the method being implemented in an electronic device comprising an optically transmissive display in communication with a control unit, the optically transmissive display being placed in the line-of-sight of the user, wherein the method comprises the steps of:
 providing a desired artificial object location;
 displaying an artificial object in the optically transmissive display at the artificial object location.

The location may comprise a global positioning system (GPS) coordinate and/or a compass heading. Determining the location may for example be performed by the user providing input regarding the distance from the golf ball to the object.

The method may further comprise the step of determining the shape and size of the artificial object.

Further effects and features of this third aspect of the present invention are largely analogous to those described above in connection with the first aspect and the second aspect of the invention.

According to a fourth aspect of the invention there is provided a computer program product comprising a computer readable medium having stored thereon computer program code for an electronic device for providing guiding to a user for executing a golf swing with a golf club on a golf ball towards a target the electronic device comprising an optically transmissive display in communication with a control unit, the optically transmissive display being placed in the line-of-sight of the user, wherein the computer program product comprises: code for identifying a location of the golf ball; code for determining a desired target direction for the golf ball; code for determining a desired trajectory of the golf ball caused by an impact between the golf club and the golf ball; and code for, displaying at least one visual guiding element in the optically transmissive display when the location of the golf ball is in the line-of-sight of the optically transmissive display, wherein the at least one visual guiding element is based on the desired target direction, and the desired trajectory, wherein a first visual guiding element provides guidance for a trajectory of the swing of the golf club, and a first indicator provides guidance for the golf club head orientation with respect to the golf ball at impact.

The invention is not limited to using an optically transmissive display, thus according to a fifth aspect there is provided an electronic device for providing guiding to a user for executing a golf swing with a golf club on a golf ball towards a target, said electronic device being in communication with a control unit and comprises a display, said display being placed in a line-of-sight of the user, wherein said control unit is configured to:

identify a location of the golf ball;
determine a desired target direction for said golf ball;
based on said desired target direction, determining a desired trajectory of said golf ball caused by an impact between said golf club and said golf ball; and
display at least one visual guiding element in said display,
wherein said at least one visual guiding element is based on said desired target direction, and said desired trajectory, wherein a first visual guiding element provides guidance for a trajectory of the swing of the golf club, and a first indicator provides guidance for the golf club head orientation with respect to the golf ball at impact. Thus, the display may be a non see-through display. The electronic device according to any of the aspects may comprise a loud speaker for providing sound instructions to the user.

According to an embodiment of the invention, said at least one visual guiding may be displayed when said location of said golf ball is in the line-of-sight of the display.

According to an embodiment of the invention, the electronic device may further comprise an image data acquisition device arranged to acquire a stream of images and to display said stream of images in said display. The image acquisition device captures image data which is shown in the display in real-time, or at least in a near real-time fashion. This provides a video see-through configuration. For example, said at least one visual guiding element may be overlaid with said stream of images. This creates an augmented reality type environment for the user.

According to a sixth aspect of the invention, there is provided a method for providing guiding to a user for executing a golf swing with a golf club on a golf ball towards a target, said method being implemented in an electronic device comprising a display in communication with a control unit, said display being placed in the line-of-sight of the user, wherein said method comprises the steps of:

identifying a location of the golf ball;
determining a desired target direction for said golf ball;
based on said desired target direction, determining a desired trajectory of said golf ball caused by an impact between said golf club and said golf ball; and
displaying at least one visual guiding element in said display,
wherein said at least one visual guiding element is based on said desired target direction, and said desired trajectory, wherein a first visual guiding element of said at least one visual guiding element provides guidance for a trajectory of the swing of the golf club, and a first indicator provides guidance for the golf club head orientation with respect to the golf ball at impact.

According to an embodiment of the invention, said at least one visual guiding element may be displayed when said location of said golf ball is in the line-of-sight of the display According to an embodiment of the invention, the method may further comprise acquiring a stream of image data and displaying said stream of images in said display.

Furthermore, the method may comprise overlaying said at least one visual guiding element with said stream of images.

According to an embodiment of the invention, the method may further comprise displaying, in said display, a recommended weight distribution of said user's feet when said user is in a preparatory state of executing a golf swing. The recommended weight distribution may be based on the predetermined experimental data.

Furthermore, said recommended weight distribution may be based on a user's measures. For example, the user may enter data specifying the height of the player, and/or other measures such as length of arm, length of upper body, length of legs etc which the control unit may use for estimating e.g. the centre of weight of the user. Furthermore, said visual guiding element may also be further based on said user's measures and chosen golf club. For example, a short user will have a different swing path compared to a tall user, or a user with long arms will have different swing path compared to a user having short arms.

In one embodiment, the method may further comprise displaying, in said display, a recommended centre of weight location for said user's body, and providing an indication when said user's estimated centre of weight location approximately coincides with said recommended centre of weight location.

Further features of, and advantages with, the present invention will become apparent when studying the appended claims and the following description.

The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing exemplary embodiments of the invention, wherein.

DESCRIPTION OF EXAMPLE EMBODIMENTS OF THE PRESENT INVENTION

Figure 1:
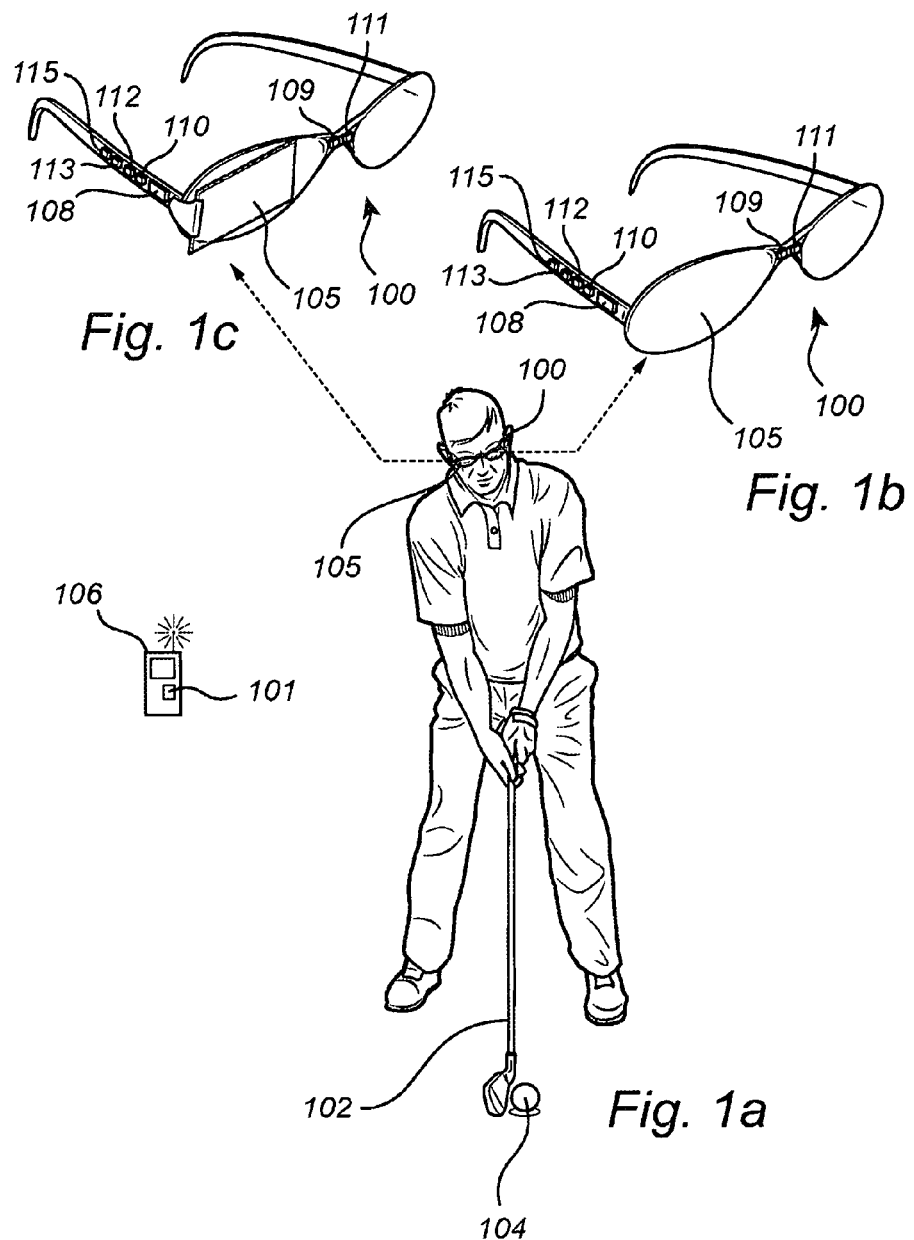
FIG. 1a schematically shows an application situation for an embodiment of the invention.
FIG. 1b illustrates an exemplary electronic device according to an embodiment of the invention.
FIG. 1c illustrates an exemplary electronic device according to an embodiment of the invention.

The present invention will now be described more fully hereinafter with reference to the accompanying drawings, in which currently preferred embodiments of the invention are shown. This invention may, however, be embodied in many different forms and should not be considered as limited to the embodiments set forth herein; rather, these embodiments are provided for thoroughness and completeness, and fully convey the scope of the invention to the skilled addressee. Like reference characters refer to like elements throughout.

FIG. 1a illustrates exemplary application of the present invention. In FIG. 1a, a user (i.e. a golf player) is wearing an electronic device 100 in the form of electronic glasses 100. The golf player is ready to swing the golf club 102 such as to perform a golf shot on a golf ball 104. The golf player is placed such that the golf ball 104 is visible through the optically transmissive display 105 of the electronic glasses 100. The optically transmissive display may form part of the glasses (i.e. being the glass-part of the glasses) or the optically transmissive display may be a separate part placed in front of the glass. The display may also be placed behind the glass. Note that the display 105 shown in FIG. 1a may also be of a type which is not optically transmissive, thus in that case the golf ball is seen in the display 105 as captured by a camera 109. Thus, the display may display the captured video in real-time, or at least near real time, to provide a video-see-through view. Thereby, it should be understood through-out the description, a display of a type which is not optically transmissive may be used in combination with an image acquisition device which provides a video-see-through view. In other words, the display 105 may be a see-through display or a non-see-through display. Naturally there may be more than one camera 109.

Embodiments of the electronic device according to the invention are shown in FIGS. 1b and 1n FIG. 1c. The embodiment in FIG. 1c, comprises a display 105 arranged in the line-of-sight of a user when wearing the device 100. In the embodiment of FIG. 1c, an image acquisition device 109 (Naturally there may be more than one image acquisition device 109) acquires image data, for example in the form of an image, or a sequence of images (e.g. a video), and in particular image data that the display 105 may show to a user in at least near real-time. The following description describes as an example the embodiment with an optically transmissive display 105, although the invention is equally applicable with a non-optically transmissive display (i.e. non see-through display).

The electronic device 100, also shown in FIG. 1b is configured to provide guiding for a golf player for performing a golf swing according to the methods described herein. Furthermore, the electronic device 100 may comprise a control unit in the form of a processor 108. The electronic device 100 may be in communication with a further control unit 101 which may be comprised in a hand-held device 106 such as a mobile phone connected to the Internet. Furthermore, the control unit 108 of the electronic device 100 may also be connected to the Internet. The communication between the control unit 101 and the electronic device 100 may be wireless or via a cable. With the hand-held device 106 more extensive information regarding statistical data regarding golf swing characteristic for providing the displayed guiding elements may be available. Note that such data may also be stored in the local processor 108. Furthermore, the electronic device may comprise an image acquisition device 109 for acquiring image data, for example in the form of an image, or a sequence of images (e.g. a video). The image may be used by the control unit 108 or 101 in order to perform image analysis which may be used for e.g. identifying the golf ball. The image acquisition device 109 may further acquire a video of the golf swing performed by the user.

The electronic device 100 may also comprise a battery, and a global positioning system (GPS) unit 110 and/or a laser range determining device 111, and/or a compass unit 112. Moreover, the electronic device 100 may comprise sensors for determining motions of the electronic device 100, thus motion of the head when the electronic device is mounted on the head of a user. This facilitates fixating the visual guiding element 304 or second guiding line 403 (see FIG. 4) at the location of the golf ball 104 as seen through the optically transmissive display 105. The sensors may be e.g. gyroscopic sensors and/or an accelerometer (e.g. a gyroscope and/or accelerometer comprised in an integrated circuit of e.g. the control unit 108). Laser range device may be used for determining the distance from e.g. the location of the golf ball to a desired target or to an obstacle on the golf course. Other types of range determining means may also be implemented. For example, in place of the laser range determining device, there may be an ultrasound range determining device 111, or an infrared light range determining device 111, or there may be a combination of such devices (laser, or ultrasound, or infrared).

The user may communicate with the electronic device by oral communication, by moving a body part (e.g. nod, instruction with the hands/fingers, or eye movements), point with the golf club, or via a handheld device such as a mobile phone or another mobile electronic device. Thus, image, voice, or motion recognition may be implemented in the electronic device, for example via the image acquisition device 109, and/or the electronic device may thus comprise a microphone 113 and a loud speaker 115 for sound communication with the user.

The electronic device 100 may possess features similar to e.g. Google Glass™ (or Epson Moverio™ BT-200, or DAQRI® Smart Helmet, or Microsoft® HoloLens), for example the optically transmissive display may be similar to the one in Google Glass™.

Figure 2:
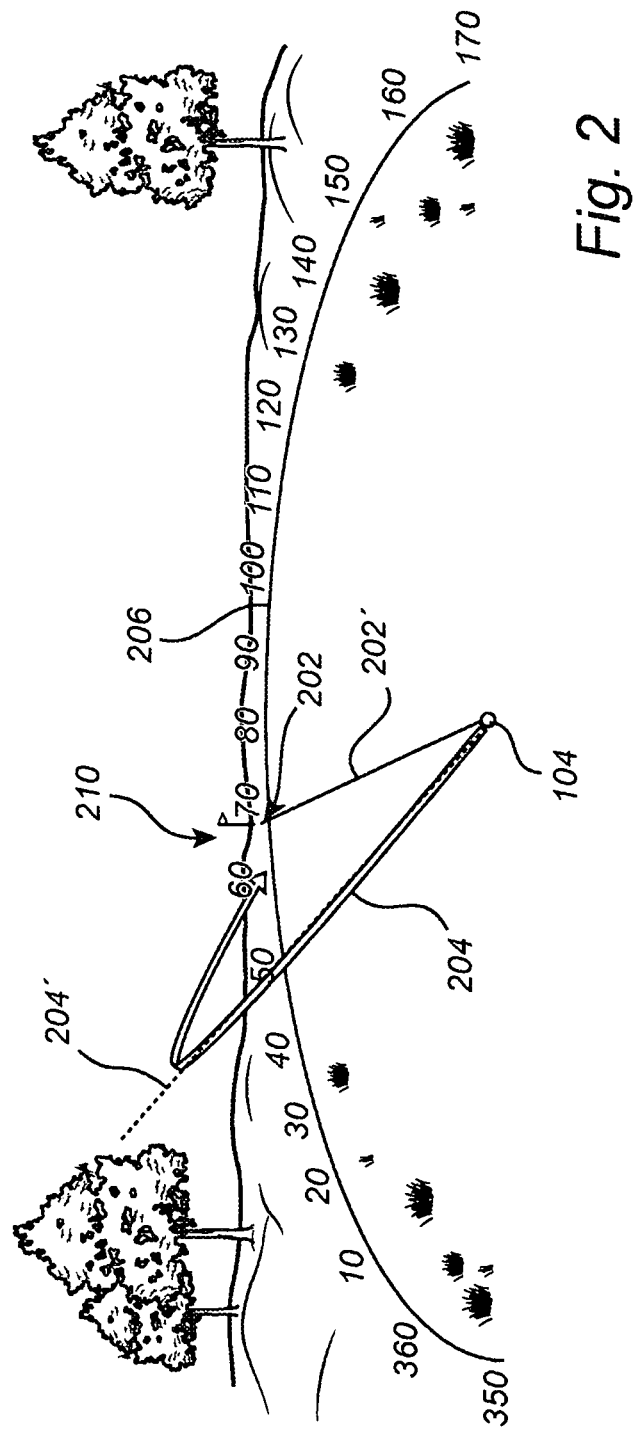
FIG. 2 schematically shows an exemplary view according to an exemplary embodiment of the invention.

FIG. 2 schematically illustrates what a user may see through the optically transmissive display 105 of electronic device 100 when preparing for performing the golf swing. FIG. 2 may also be used to describe method steps according to an exemplary embodiment of the invention. In FIG. 2, there is shown a desired target direction 202 indicating the direction of the desired final location 210 for the golf ball, thus the desired result of the golf shot to be executed and there is also shown a desired trajectory 204. Although the desired final location ("desired target") is here shown as a flag e.g. on a green, this does not have to be the case, thus the golf shot may be performed at any location with an arbitrary final location (desired target). The desired target direction 202 is shown as the heading (in this particular case approximately "68") on the "ruler" 206 and is further indicated by a line displayed in the optically transmissive display from the location of the golf ball (or another location determined by the user) and the desired final location of the golf ball 104. The initial direction of the golf ball after the impact with the golf club may be specified as the intersection of a tangent 204' of the initial direction of the desired trajectory 204 and the ruler 206. Alternatively, the initial direction is the intersection between the desired trajectory 204 and the ruler 206. As a method step according to an embodiment of the invention, the desired target 202 direction is determined. Note that the actual line 202' is only optionally displayed in the optically transmissive display. Furthermore, the line 204' is also optionally displayed in the optically transmissive display.

Figure 3:
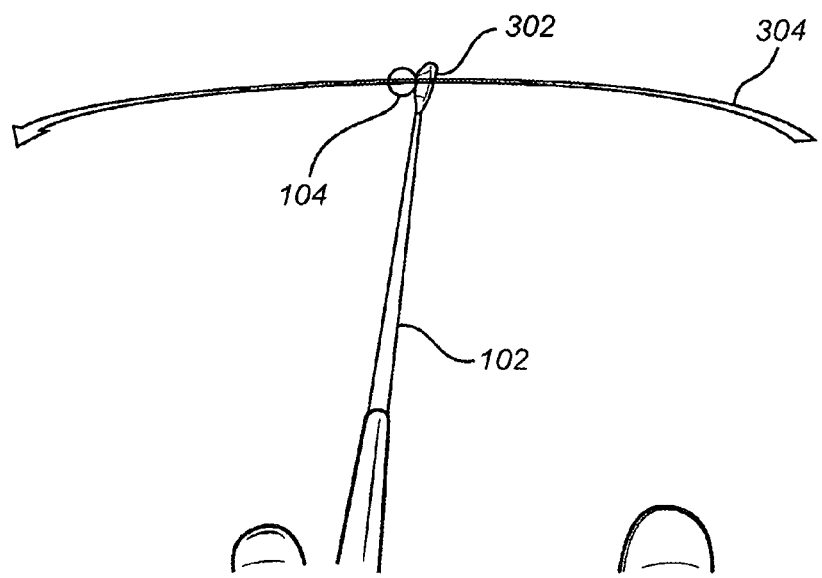
FIG. 3 schematically shows another exemplary view according to an exemplary embodiment of the invention.

When the desired target direction 202 has been determined, either by the player or as a suggestion from the electronic device 100 or the external hand-held device 106, the player turns to the golf ball 104, thus the golf ball 104 is in the line-of-sight of the optically transmissive display 105. This view is shown in FIG. 3. In FIG. 3, the golf ball 104 and at least part of the golf club 102 (in particular the golf club head 302) are visible through the optically transmissive display 105. There is further shown a visual guiding element 304 displayed in the optically transmissive display 105. The visual guiding element 304 is shown as a solid guiding line but may of course take other shapes such as dashed, dotted, or may be separated guiding marks, etc. The visual guiding element 304 is based on the desired target direction 202, 202' and the desired trajectory 204, and provides guiding for the user for a trajectory of a swing path of the golf club 102, preferably for the golf club head 302. Furthermore, also based on the desired target direction 202 and the desired trajectory 204, a first indicator (not shown) provides guidance for the orientation of the golf club head 302 with respect to the golf ball 104. The first indicator may be in the form a second visual guiding line, or e.g. a sound signal or a vibration (haptic) signal indicating when the orientation is correct. The determination of the visual guiding element 304 and the first indicator may be based on predetermined statistical data from previously performed golf shots, for example performed by a robot with known settings of e.g. the golf club head orientation, swing path, club choice, and swing speed.

The golf balls may have been hit in, or close to, the centre of the clubface surface of the used club by the robot. This may be known as the sweet spot, or the sweet spot of the clubface surface. A Doppler radar with similar features as e.g. TRACKMAN® or FlightScope® may be used to collect and analyze data of these golf shots, e.g. club path, club attack angle, clubface angle, club dynamic loft, club spin loft, ball launch angle, ball vertical launch angle, ball horizontal launch angle, ball spin axis, ball max height of trajectory, ball land angle, ball length of carry and ball roll distance. These data may be displayed, in the optically transmissive display 105 of electronic device 100, as augmented reality for each selected and/or desired golf shot.

Figure 4:
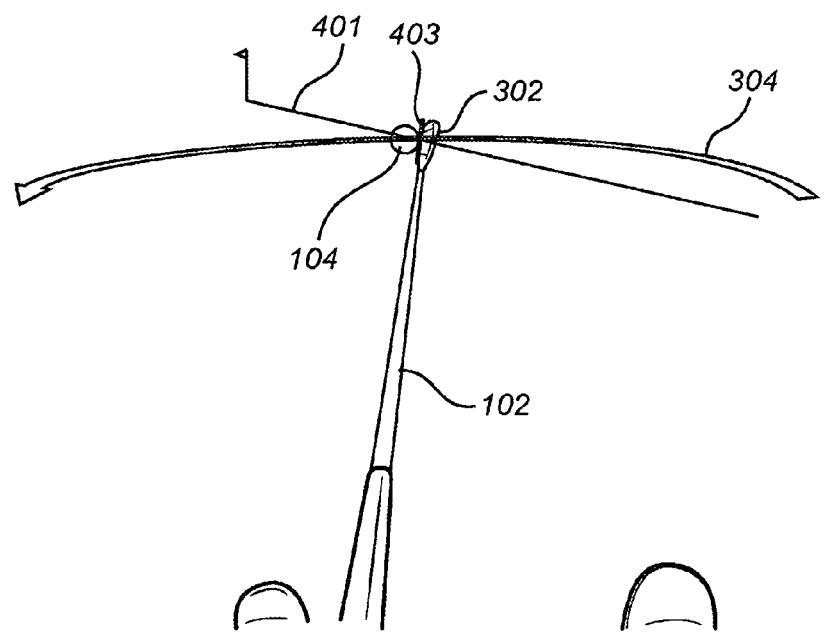
FIG. 4 schematically shows another exemplary view according to an exemplary embodiment of the invention.

FIG. 4 shows another embodiment of the invention. Here, a third guiding line 401 is displayed indicating the desired target direction 202. This provides additional guidance for the player which then simultaneously may see the direction of the desired target 210 and the swing path 304. Furthermore, here the first indicator 403 is shown as a second guiding line 403 which provides the user with guidance for the club head 302 orientation. All the guiding lines and indicators may be determined based on predetermined data based on previously performed golf shots.

Figure 5:
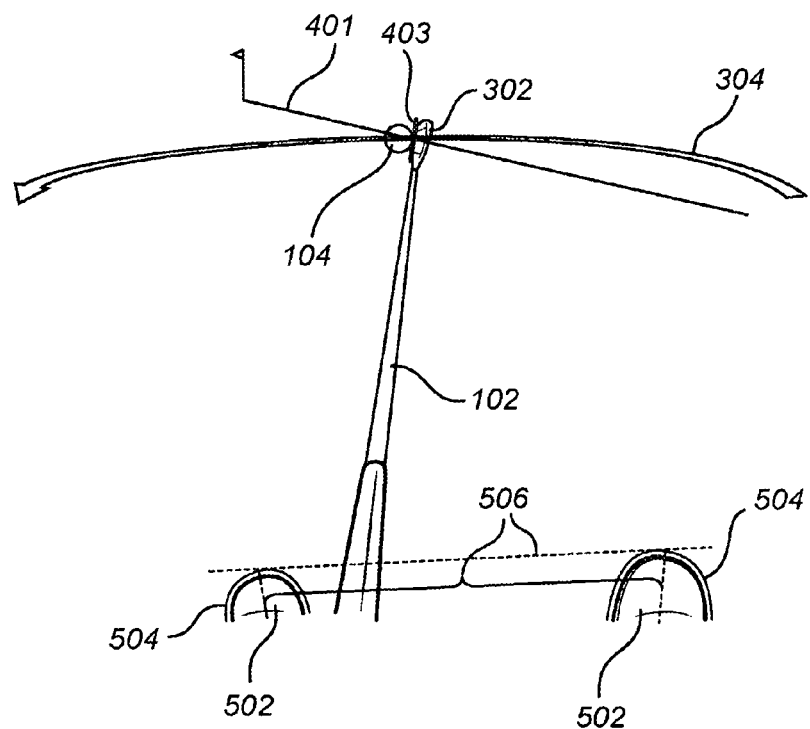
FIG. 5 schematically shows another exemplary view according to an exemplary embodiment of the invention.

Furthermore, as is shown in FIG. 5, in one embodiment the method may comprise displaying guiding lines 504, 506 for guiding the user to place his/her feet 502 correctly. Thus, depending on the type of golf shot and the desired target direction 202, and the desired trajectory 204, a player may be instructed to place his/her feet 502 accordingly. The feet guiding lines 504 are thus a recommendation given by the electronic device. Note that the guiding lines for the feet may take different forms, for example as the lines 504 surrounding portions of the feet or as lines indicating the relative position of the feet (dashed lines 506), or both 504 and 506. Note that the actual lines displayed in the display 105 indicating the feet positions may take other forms (e.g. solid, dashed, dotted, etc.) than what is depicted in the FIG. 5.

Figure 10:
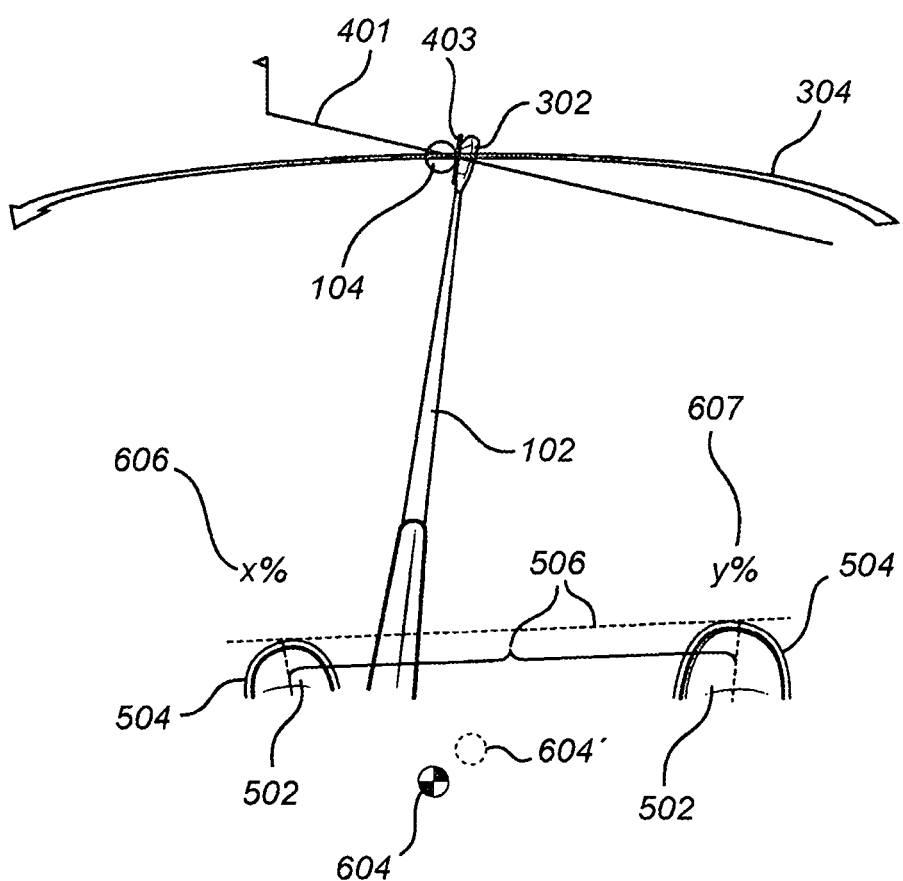
FIG. 10 schematically shows another exemplary view according to an exemplary embodiment of the invention.

Additionally or alternatively, the electronic device may display a recommended weight distribution in the display 105. As shown in FIG. 10 which also shows the features of FIG. 5, the recommended weight distribution 606 and 607 may for example be shown in the form of a percentage of the weight that the user should attempt to put on the respective foot. For example, the left foot should have e.g. 60% (i.e. x=60) and the right foot should have 40% (i.e. y=40). Other displaying options may be possible, for example by varying the thickness of the lines 504 or 506 (e.g. a thicker line indicates more weight, or a thicker line portion indicates more weight is recommended in the side of the thicker portion compared to a less thick line portion). Based on a user's measures, e.g. the height of the user, the electronic device 100 or 101 may calculate an estimated centre of weight 604' (including chosen golf club, shoes and clothes) in all three dimensions for the user and may show this in the display 105. Furthermore, the electronic device 100 may show, in the display 105, a recommended centre of weight 604 in all three dimensions for the user (including chosen golf club, shoes and clothes) based on the user's measures and chosen golf shot. A calculation of estimated centre of weight 604' can be done in different ways. For example, one way is to do as follows: the user starts standing normally, with the legs and backbone as straight as possible with the ball 104 midway between the feet, i.e. a certain type of stance. The user then looks down on the ball and a range determining device 111 measures the distance from the range determining device 111 to the ball 104 and to the left and right foot. The processor in 100 or in 101 may then calculate where the centre of weight is located in relation to the core of the golf ball 104. When the user has decided type of golf shot and guiding line(s) and recommended feet orientation is displayed, the user take the same stance as earlier, at the same distance as the displayed recommended feet orientation from the ball as a calibration step. When this is done, the user gives a signal. The processor in 100 or in 101 may now calculate if the ball 104 is at a higher level, at the same level or at a lower level with respect to the user's feet. The display 104 shows the recommended centre of weight 604 and the estimated centre of weight 604'. The user may then adjust its estimated centre of weight 604' to match the recommended centre of weight 604. The recommended centre of weight 604 and the estimated centre of weight 604' may be displayed in other ways than shown herein, for example in the form of two spheres, or in other 2D or 3D configurations. Furthermore, when the recommended centre of weight 604 and the estimated centre of weight 604' approximately matches an indication is given by the electronic device to the user, for example a sound or a vibration may indicate that the recommended centre of weight 604 and the estimated centre of weight 604' matches, or the recommended centre of weight 604 and the estimated centre of weight 604' as shown in the display disappears when they match.

A calibration like this may be done when the ball is not on the same level as the user's feet. The recommended feet orientation, 504 and/or 506, may be changed if the ball is not on the same level as the user's feet.

Figure 6:
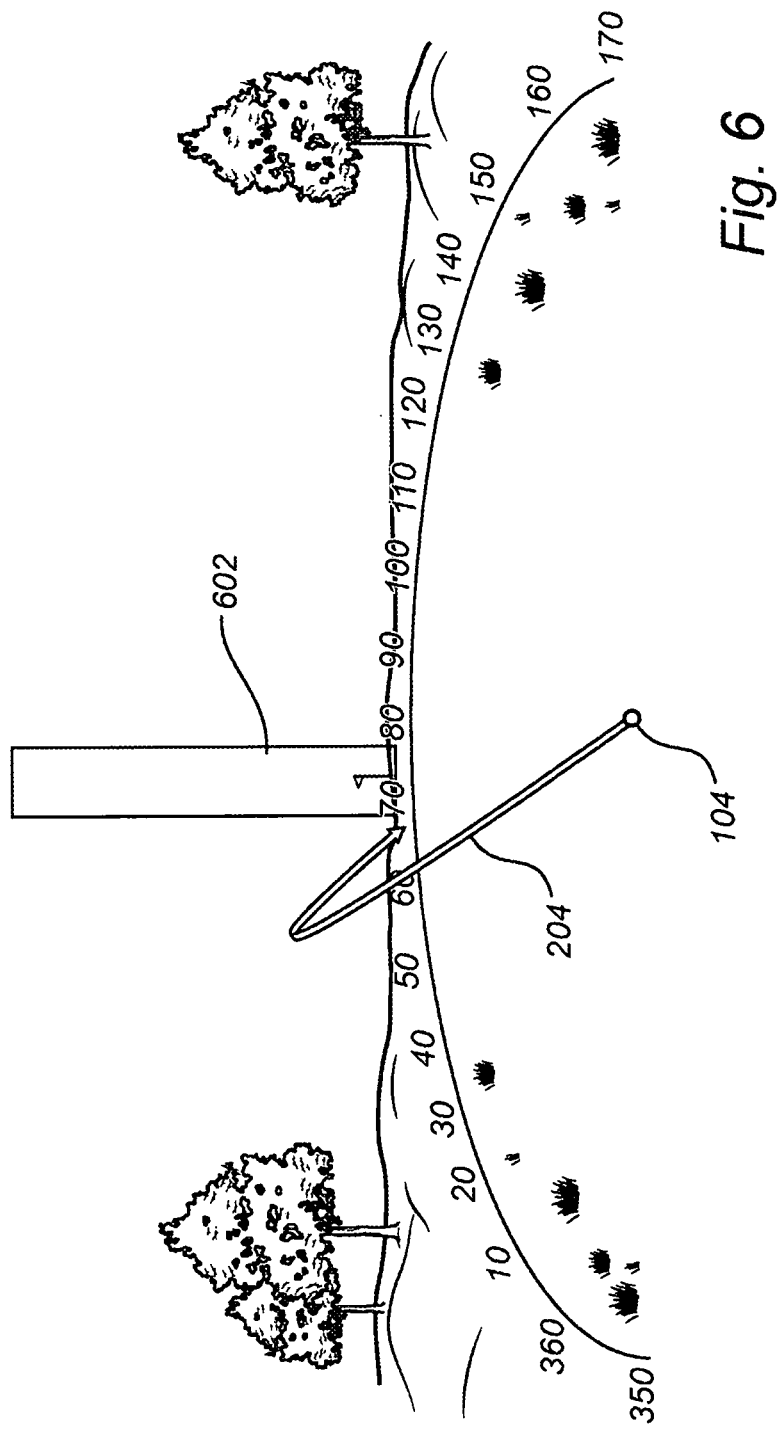
FIG. 6 schematically shows another exemplary view according to an exemplary embodiment of the invention.

FIG. 6 shows artificial object 602 displayed in the optically transmissive display 105. The artificial object 602 may be in the form of an artificial target which the player should try and hit with the golf ball 104, or the artificial object may be in the form of an artificial obstacle which the player should avoid to hit with the golf ball. As shown in FIG. 6, an artificial object 602 is shown as an artificial target 602. The player may provide input for determining how far away the target 602 should be, at which height from the ground the target should be located, the size, and also the shape of the target 602. The target may take any shape, e.g. a bar, a circle, a square, or any free-form shape, or even a photo or a clipart. The artificial object may also be in motion, randomly or between predetermined points.

Moreover, the artificial object 602 may be placed in a location by the user prior to entering the golf course or practice area. For example, by inputting a type or shape of the artificial object 602 and a GPS coordinate, the control unit of the electronic device may already know where to place the artificial object 602 and may also calculate the distance from a present location of the electronic device to the location of the artificial object. The GPS coordinate and/or the shape may be entered online (e.g. in the cloud of an Internet based application) on a remote computer.

Figure 7:
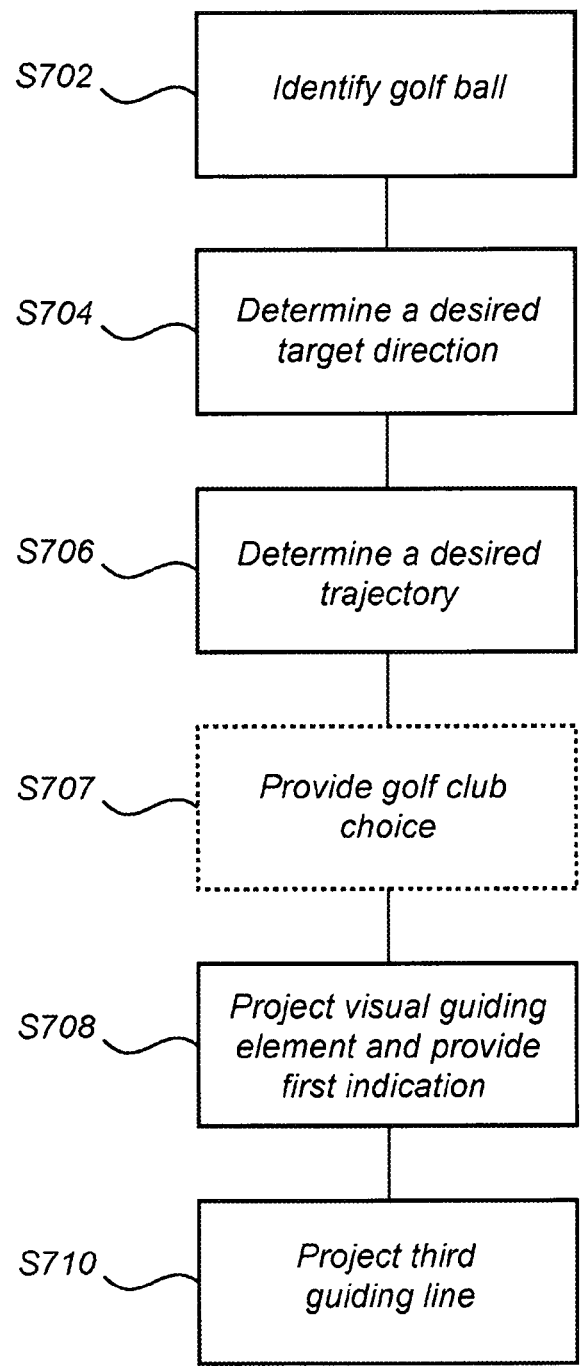
FIG. 7 is a flow-chart of method steps according to an exemplary embodiment of the invention.
Figure 9:
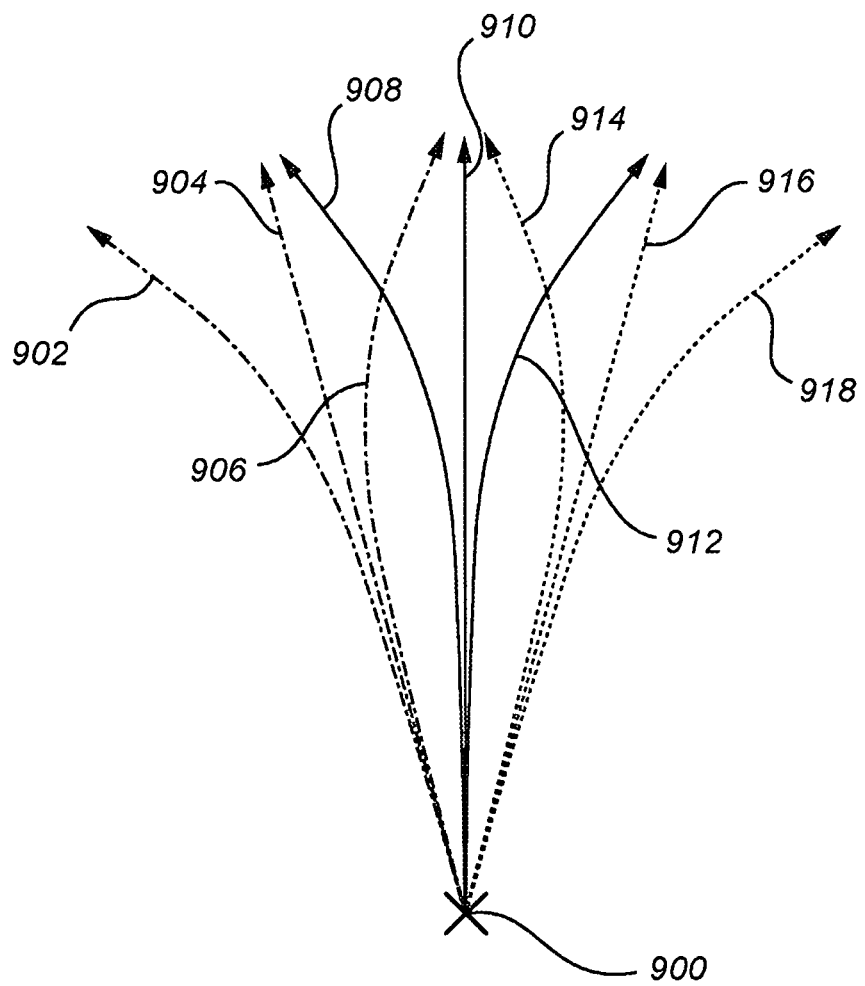
FIG. 9 shows exemplary types of golf shots for a right-handed player.

FIG. 7 is a flow-chart illustrating the method steps according to an embodiment of the invention. The method may be used for providing guiding for a user for executing a golf swing with a golf club on a golf ball. The method may be implemented in an electronic device 100 comprising an optically transmissive display 105 located in the line-of-sight of the user. The electronic device may be in communication with an external hand-held device 106. In a first step S702 of the method a location of the golf ball is identified. Note that the location may be determined by the player or by image recognition by a control unit of the electronic device, or a control unit 106 in communication with the electronic device, for example in wireless communication or via a cable. In a subsequent step S704, determining a desired target direction 202 for the golf ball 102 is performed. The desired target direction 202 may for example be a heading 202' on a ruler 206 (e.g. compass heading) shown in the optically transmissive display 105. The user may provide the desired target direction himself. The desired target direction 202, 202' is the direction towards the desired final target for the golf ball 104. Subsequently, in step S706, a desired trajectory 204 of the golf ball 104 is determined based on the desired target direction. The desired trajectory 204 may indicate at least a portion of the resulting flight path of the golf ball. A tangent 204 'of the initial flight path, thus an initial portion of the desired trajectory 204 may be specified by a heading of the tangent 204'. In a subsequent step S708, at least one visual guiding element 304 is displayed in the optically transmissive display. For example, the visual guiding element may be a guiding line 304 showing the swing path of the golf club 102 (or at least the golf club head 302) for accomplishing a golf shot according to the desired target direction 202 and desired trajectory 204. Furthermore, a first indicator for indicating the correct orientation of the golf club head with respect to the golf ball is provided. The first indicator may be in the form of a second visual guiding line 403 or it may be an audio signal or a haptic signal (thus a vibration). Furthermore, the guiding lines may be fixed in relation to the location of the golf ball. Alternatively, the guiding lines 304, 403 are manually placed over the location of the golf ball by the user moving his/her head position. Optionally, a third guiding line 401 may also be displayed in step S710 which provides an indication of the direction of the desired target 210. The third guiding line 401 may be displayed when the user has the optically transmissive display 105 pointing in the direction of the golf ball, or in the direction of the desired target 210. Optionally, in a preceding step S707, the player may provide information regarding golf club choice. This way, the guiding lines may further be based on the choice of golf club, i.e. iron 1-9, pitching wedge, sand wedge, woods, driver, hybrid, etc. Further optionally according to an embodiment, the user may provide information regarding the type of desired golf shot, for example a fade or a draw type golf shot (or e.g. pull-draw 902, pull 904, pull-fade 906, straight-draw 908, straight 910, straight-fade 912, push-draw 914, push 916, push-fade 918) as shown in FIG. 9 from the point of view of the location 900 of a right-handed player, although there may be more types of golf shots not illustrated in FIG. 9 which shows examples of types of golf shots. Thus, the guiding lines or indicators may further be based on the type of golf shot. Note that the method steps may of course be performed in a different order than what is depicted in FIG. 7.

Figure 8:
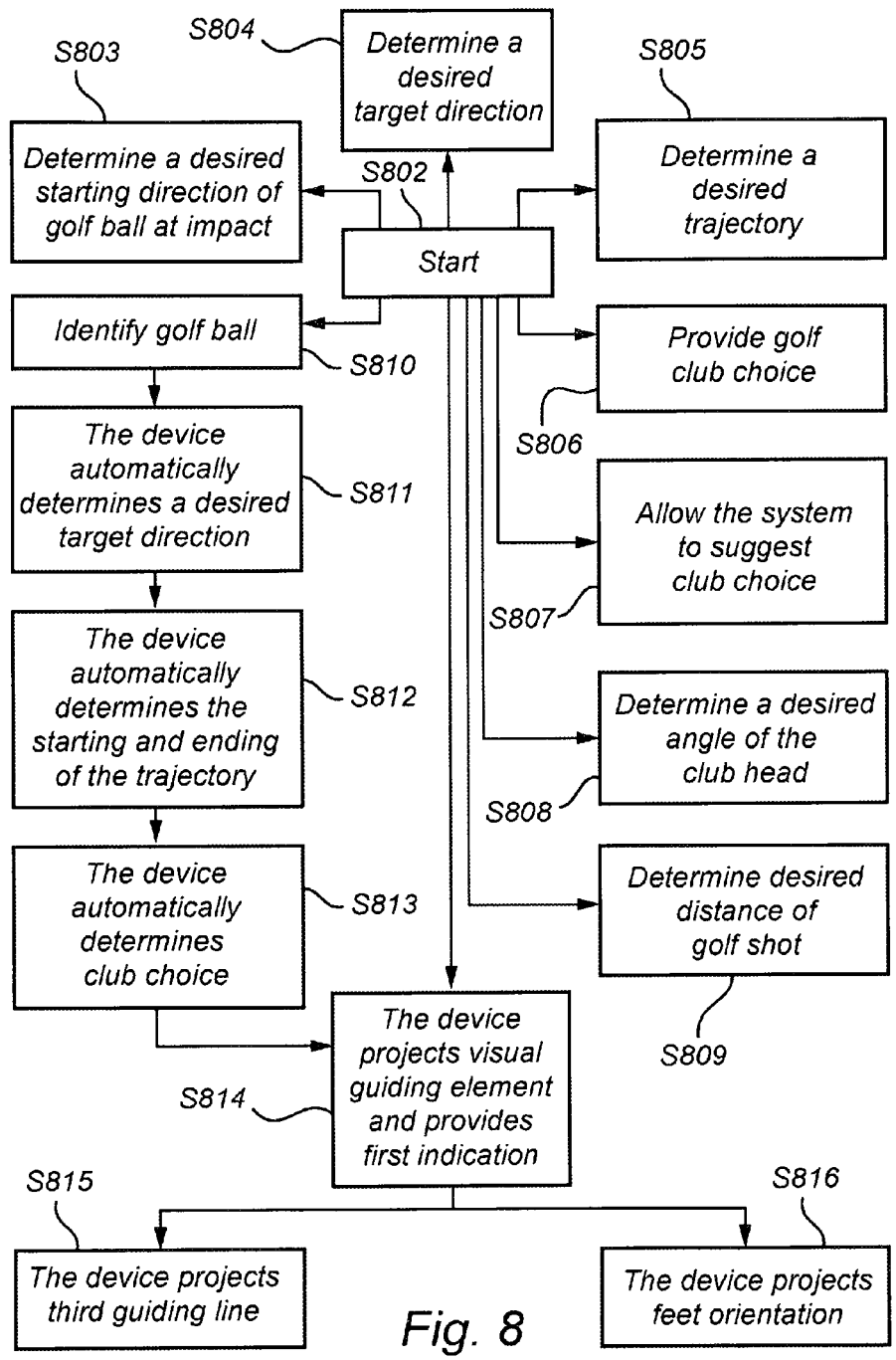
FIG. 8 is an overview flow-chart illustrating method steps according to embodiments of the invention.

FIG. 8 illustrates another flow-chart showing several method steps which the user may choose from. Thus, the flow-chart shown in FIG. 8 illustrates method steps and choices that the user may take.

For example, from a starting point S802 the player may choose any one of steps S803-S810 in an independent order. The steps S803-S810 may be choices or decisions made by the user. For example, first a desired target direction may be determined S804 and then either the player him/herself makes the decision S806 about the choice of golf club or the electronic device suggests a club S807. Subsequently, the orientation of the golf club head is determined S808, for example depending on the type of golf shot. Furthermore, the desired club head orientation may be a choice made by the player. In other words, the player may adjust the club head orientation if desired. This would adjust the desired trajectory. Furthermore, the player may first be provided with a suggested club but decide to change the suggested choice, thus the steps S806 and S807 may be reversed.

Figure 11:
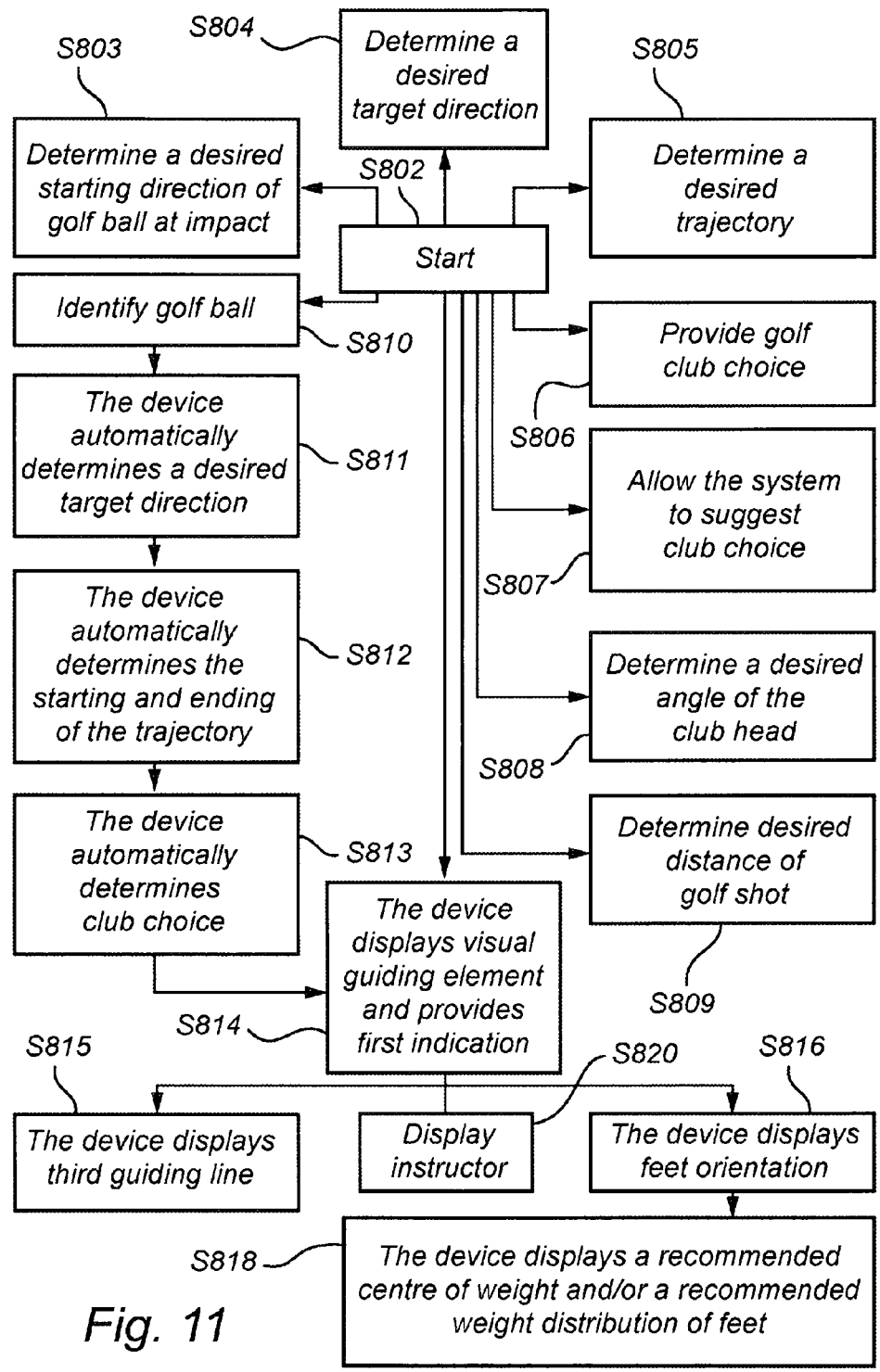
FIG. 11 is a flow-chart of method steps according to an exemplary embodiment of the invention.

The method steps S810-S814 may be performed in an automatic manner, thus, as suggestions from the electronic device. For example, first the location of the golf ball is identified S810 by the electronic device 100. Subsequently, the desired target direction is determined S811 and later the start and the end of the desired trajectory S812. Thereafter, in step S813, a golf club choice is suggested by the electronic device 100. Subsequently, visual guiding lines are displayed and the first indication for finding the correct orientation of the golf club head is provided in step S814. Following steps may for example be to display the third guiding line 401 indicating the desired target direction 202 and/or to display feet guiding lines 504 and/or feet guiding lines 506 (step S816). The steps S815 and S816 may also be performed in an automatic manner, thus in these cases S810-S815 may be performed in an automatic manner, or S810-S816 may be performed in an automatic manner excluding or including step S815. FIG. 11 shows another flow-chart showing several method steps which the user may choose from similar to FIG. 8, but with an additional step S818 related to displaying a recommended centre of weight and/or a recommended weight distribution of the user's feet as described with relation to FIG. 10. Furthermore, there is also an additional step S820 of displaying an artificial instructor in the display. For example, an augmented reality based instructor may be shown in the display before, during or after the user has performed a golf shot. The user may study the augmented reality based instructor's swing from all directions and may pause or change the speed of the swing. The instructor may further provide oral or visual advice to the user regarding the user's planned golf swing. In other words, there may be displayed, in said display, an artificial instructor, wherein said instructor executes a golf swing for providing advice to said user. The type and the size of the instructor may be changed. For example, the user may have problem e.g. with performing desired fade shots or slice shots. The instructor may then show the user what the user should do to correct the swing. The problem may be e.g. wrong ball placement, wrong club head orientation, wrong trajectory of swing path, wrong feet orientation, wrong weight distribution or combinations of these.

As an example, an example application situation will now be described. First the user identifies the location of the golf ball 104. Subsequently, the electronic device 100 (or hand-held device 106) provides a suggestion regarding the golf ball trajectory (e.g. desired trajectory 204) and golf club choice. This is possible since the electronic device may know the remaining distance to the hole, possible obstacles, and the general golf course topology from previously stored (on the electronic device 100) information or information from the Internet. Furthermore, the electronic device 100 (or hand-held device 106) may have previously stored information about the distance the user typically accomplishes with different golf clubs. The user may now either accept or modify e.g. the desired trajectory and/or the golf club choice and instructs the electronic device accordingly. A desired trajectory 204 is now displayed in the optically transmissive display 105. When the user directs the display towards the golf ball, the guiding lines 304, 401, 403 (swing line, desired target line, club head orientation line) may be displayed. Optionally, the user may provide information to the electronic device regarding type of golf shot (e.g. draw, fade, etc).

A further example application situation will now be described. The player first identifies the golf ball 104 on the golf course. The location of the golf ball 104 is identified by the electronic device 100. Next, the player suggests a type of golf shot, for example a hook. The electronic device then displays in the optically transmissive display the trajectory of a hook in the display. A portion of the trajectory adjacent to the golf ball is fixed at the location of the golf ball in the optically transmissive display 105. Thus, if the player moves to the left behind the ball, the remaining portion of the trajectory moves accordingly to the right, correspondingly, if the player moves to the right behind the ball, the remaining portion of the trajectory moves accordingly to the left. In a subsequent step, the player suggests that the trajectory should be different. For example, the player may suggest that the trajectory (thus the "hook") should be narrower and longer. In the case of the hook shot, the trajectory will then also be lower in order to reach the longer distance e.g. with a club with less loft (i.e. less iron club number). Naturally, the player may suggest a wider and a shorter trajectory, or other combinations. If the player signals that the trajectory is the desired trajectory, the electronic device may now provide a suggested club choice. The distance which may be reached by the desired trajectory may be shown as a number in the optically transmissive display. The electronic device displays the first visual guiding element in the display and also provides an indicator (e.g. visual, audio, haptic) for the club head orientation. The first visual guiding element and the indicator are based on e.g. the desired trajectory.

Another example will now be described. The player first identifies the golf ball 104 on the golf course. The location of the GPS coordinates of the golf ball 104 is identified by the electronic device 100. Next, the player suggests a type of golf shot, for example a hook. The electronic device then displays, in the optically transmissive display, the ball trajectory of a hook. The player gives a signal to the electronic device 100 to see how the course looks like ahead, for example on a map, to decide where on the course the desired target is. The player then gives a signal to the electronic device where the desired target is and the electronic device knows on which GPS coordinates the desired target is. The player may now change type of golf shot and the electronic device may now provide a suggested club choice. The electronic device displays the first visual guiding element in the display and also provides an indicator (e.g. visual, audio, haptic) for the club head orientation. The first visual guiding element and the indicator are based on e.g. the desired ball trajectory. During the preparation of the golf shot the golf player may hear artificial commentators, imitating a TV broadcast, talking about e.g. the wind, hazards, recommendations of what the golf player should think of etc. The golf player may choose to play against other artificial golfers shown as augmented reality, displayed in the optically transmissive display 105 of electronic device 100. The artificial commentators may talk about these artificial golfers as well.

The electronic device may track the resulting golf ball trajectory, which is the result of the golf shot, using image processing. Thus, the electronic device 100 may display the resulting golf ball trajectory in the optically transmissive display 105 together with the desired trajectory such that the user may compare the result of the real golf ball trajectory with the desired trajectory 204. The electronic device may comprise an image data acquisition device such as a camera.

The location of the golf ball may be stored as a first coordinate in the control unit. The first coordinate may for example be adjacent to the centre of the core of the golf ball.

Further, the guiding lines and indicator (or indicators) may be determined based on predetermined data based on previously performed golf shots. For example, a robot or simulator may perform a large number of golf shots with known settings of the club head orientation, swing line, type of golf shot, or golf club choice, etc. The robot or simulator may then perform a large number of golf shots and record the result, thereby collecting statistical data about the golf shots. This data may then be used to determine the visual guiding element and the indicator (e.g. visual, audio, or haptic).

In addition, the user may instruct the electronic device to move the guiding lines vertically. The user then instructs the electronic device accordingly The device recommendations and all decisions that the user signals or input may be stored in the electronic device 100 which may be in communication with a further control unit 101 which may be comprised in a hand-held device 106 such as a mobile phone connected to the Internet. These recommendations, signals and input may thus be analyzed on the control unit 101, or stored in the cloud and analyzed on another type of computing device.

Figure 12:
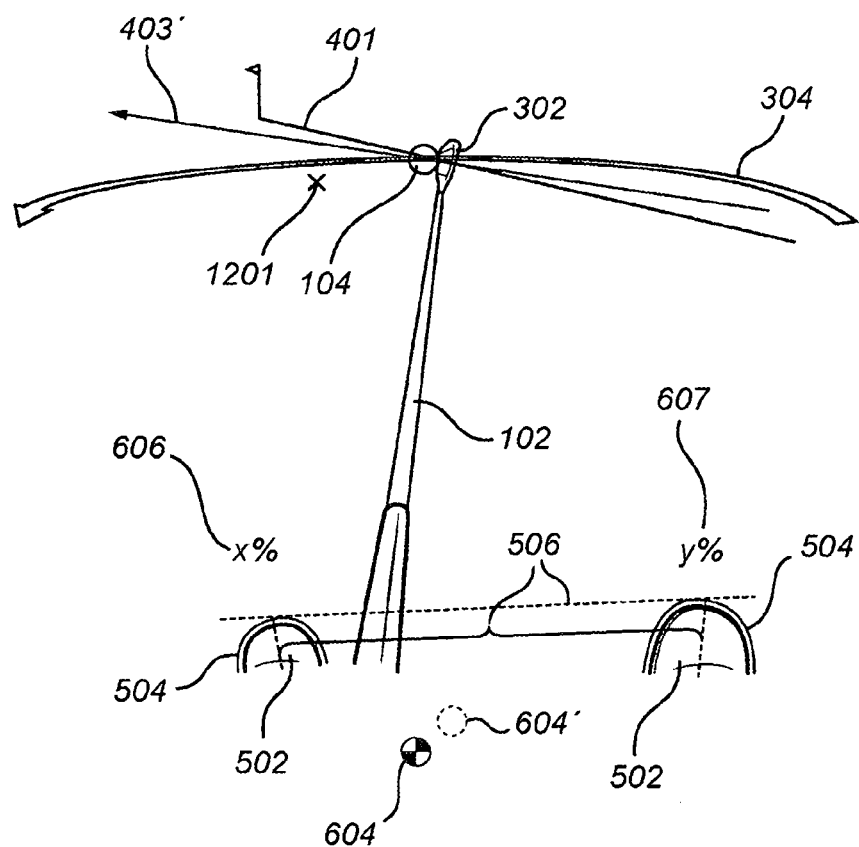
FIG. 12 schematically shows another exemplary view according to an exemplary embodiment of the invention.

Now turning to FIG. 12 showing an alternative embodiment of the method where the first visual indicator or second guiding line 403 described earlier, is replaced with guiding line 403'. Guiding line 403' is displayed in the optically transmissive display 105 of electronic device 100, and shows a horizontal line, i.e. a horizontal projection, of a line which is perpendicular to the desired clubface position at impact with the ball 104. Stated differently, the guiding line 403' is a line showing a horizontal projection of the normal to the desired clubface position at impact with the ball 104. This may facilitate the user's training to provide a desired club face alignment at the point of impact. Note that the guiding line 403' passes through the club head 302 and extends approximately an equal length in opposite direction from the golf head 302. It is possible that the guiding line 403' instead only extends in one direction, or longer in one of the directions in order to reduce the visual clutter, e.g. the amount of lines and directions, displayed in the optically transmissive display 105 of electronic device 100.

FIG. 12 also shows another optional feature of the invention, a mark 1201 displayed in the optically transmissive display 105 of electronic device 100 that helps the golf player to focus on a desired spot. This mark can be positioned either by the golf player or by the electronic device 100. The design, size and the color of the mark can be changed by the golf player. The mark 1201 helps the golf player to focus on a point different than the golf ball 104, or a part of the golf ball 104, or any other point which may be detrimental to the ability of the golf player in question. This may enable the golf player to correct an undesired behavior such as an erroneous swing trajectory, or weight distribution etc.

Figure 13:
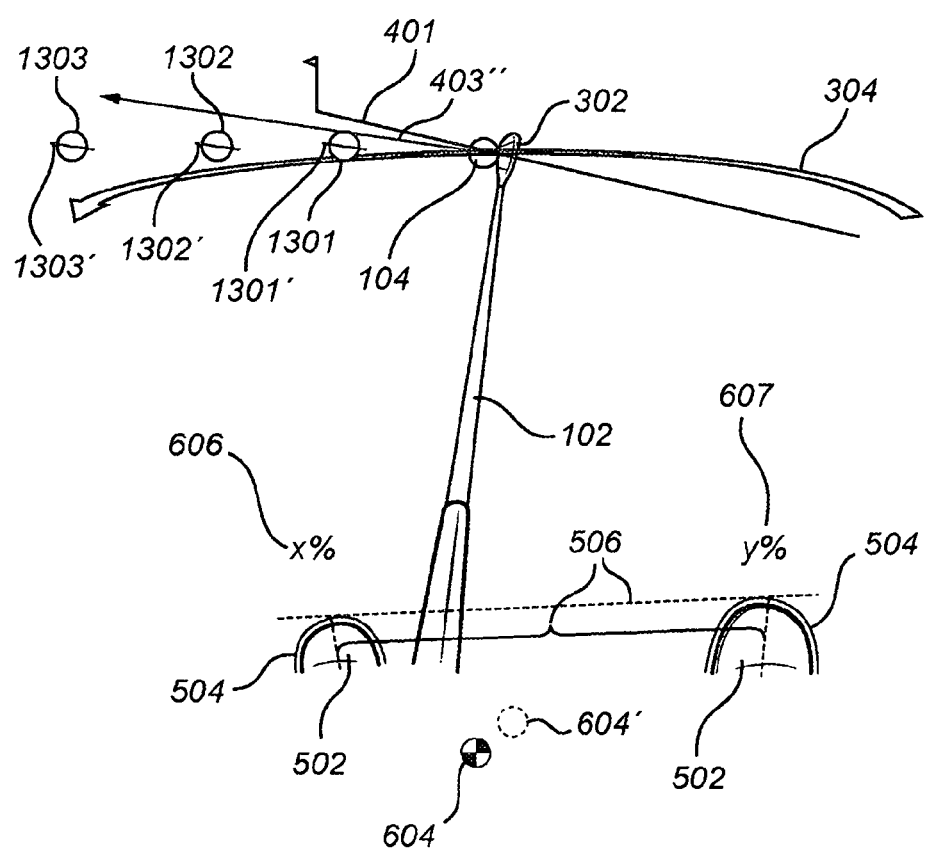
FIG. 13 schematically shows another exemplary view according to an exemplary embodiment of the invention.

FIG. 13 shows an embodiment of the method where the first visual indicator or second guiding line 403 described earlier, is replaced with guiding line 403". Guiding line 403" is displayed in the optically transmissive display 105 of electronic device 100, and shows a line that is perpendicular to the desired clubface position at impact with the ball 104. Stated differently, the guiding line 403" is a line showing the normal to the desired centre of the clubface surface, i.e. sweet spot, at impact with the ball 104. Note that in this case the guiding line 403" is a normal to the centre of the clubface surface at impact. Alternatively, the guiding line 403" may be projected horizontal, or vertically, or be projected at least partly horizontally or at least partly vertically (not shown). In principle, the guiding line 403" may be shown either horizontally or vertically, or at any step in between. This may facilitate the user's training of achieving a desired club face alignment at the point of impact.

Further, the desired trajectory 204, i.e. the desired ball trajectory is now instead illustrated by at least one golf ball 1301, or 1302 or 1303 respectively. The desired trajectory may be illustrated by at least two consecutive golf balls 1301, and 1302 or 1303. In the present exemplary illustration three consecutive golf balls 1301, 1302, 1303 are shown, it is of course possible to use just one golf ball as the user also has the real golf ball 104 as a point of reference, or two golf balls, or more than three golf balls such as four to ten golf balls or more than ten golf balls. Furthermore, the axis of the desired ball spins 1301', 1302', 1303' of the desired ball trajectory is shown for each of the golf balls 1301, 1302, 1303. The desired golf ball spin, and thus the spin axis 1301', 1302', 1303' determines a portion of the trajectory of the golf ball 104 after impact. This may facilitate the user's understanding of the underlying physical phenomena of a desired golf ball trajectory, and more importantly the importance of a correct swing trajectory and club face alignment at the point of impact. The golf balls 1301, 1302, 1303 and the axis of the desired ball spins 1301', 1302', 1303' are displayed in the optically transmissive display 105 of electronic device 100 as augmented reality.

Figure 14:
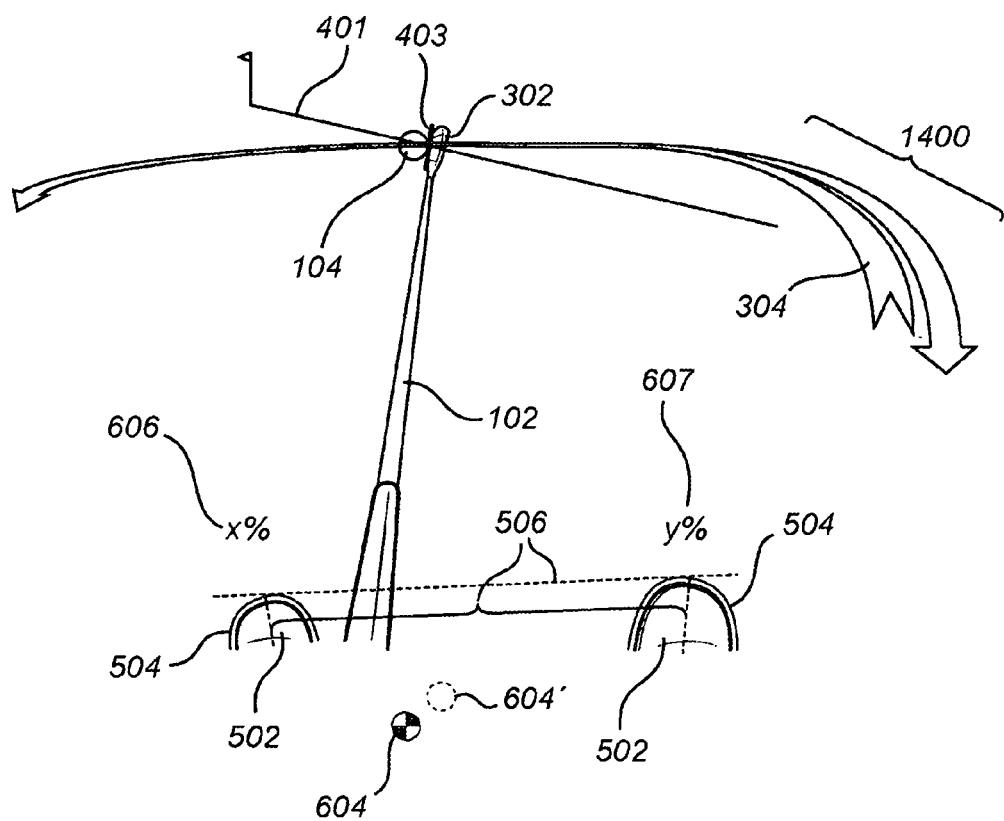
FIG. 14 schematically shows another exemplary view according to an exemplary embodiment of the invention.

FIG. 14 shows an alternative embodiment of the method where the visual guiding element 304 described earlier, additionally comprises an elongated visual guiding element portion 1400 which additionally shows the backswing, i.e. the start of the swing of the first visual guiding element 304. The elongated visual guiding element portion 1400 may be connected to the visual guiding element 304 as a complete swing (not shown). The visual guiding element 304 and the elongated visual guiding element portion 1400 may form a continuous line. Alternatively, the connection between the visual guiding element 304 and the elongated visual guiding element portion 1400 may be discontinuous. Hence, the elongated visual guiding element portion 1400 may be spatially separated from the visual guiding element 304. The visual guiding element 304 and the elongated visual guiding element portion 1400 are displayed in the optically transmissive display 105 of electronic device 100. The elongated visual guiding element portion 1400 is similarly to the visual guiding element 304 shown as a solid guiding line but may of course take other shapes such as dashed, dotted, or may be separated guiding marks, etc. Hence, the elongated visual guiding element portion 1400 provides guidance for the user for a swing trajectory of a backswing of the golf club 102, which shows the start of the swing, preferably for the golf club head 302. The elongated visual guiding element portion 1400 may be based on the desired target direction 202, 202' and/or the desired trajectory 204. Note that visual guiding element 304 overlays the elongated visual guiding element portion 1400 as the downswing may overlap the backswing. Alternatively, the visual guiding element 304 may not overlap the elongated visual guiding element portion 1400 as the backswing and downswing trajectory of the golf swing may not overlap until ball impact.

Alternatively, the whole swing path may be displayed utilizing a continuous elongated visual guiding element (not shown), or a plurality visual guiding elements (not shown) in order to provide a user with a continuous and complete guidance along the entire trajectory of the golf swing. Hence, although not explicitly shown the whole swing may be shown, i.e. the backswing, the downswing and the follow through may be shown by a single continuous visual guiding element, or a plurality visual guiding elements. Such a single continuous visual guiding element may be shown as a solid guiding line but may of course take other shapes such as dashed, dotted, or may be separated guiding marks such as a plurality visual guiding elements, etc.

Figure 15:
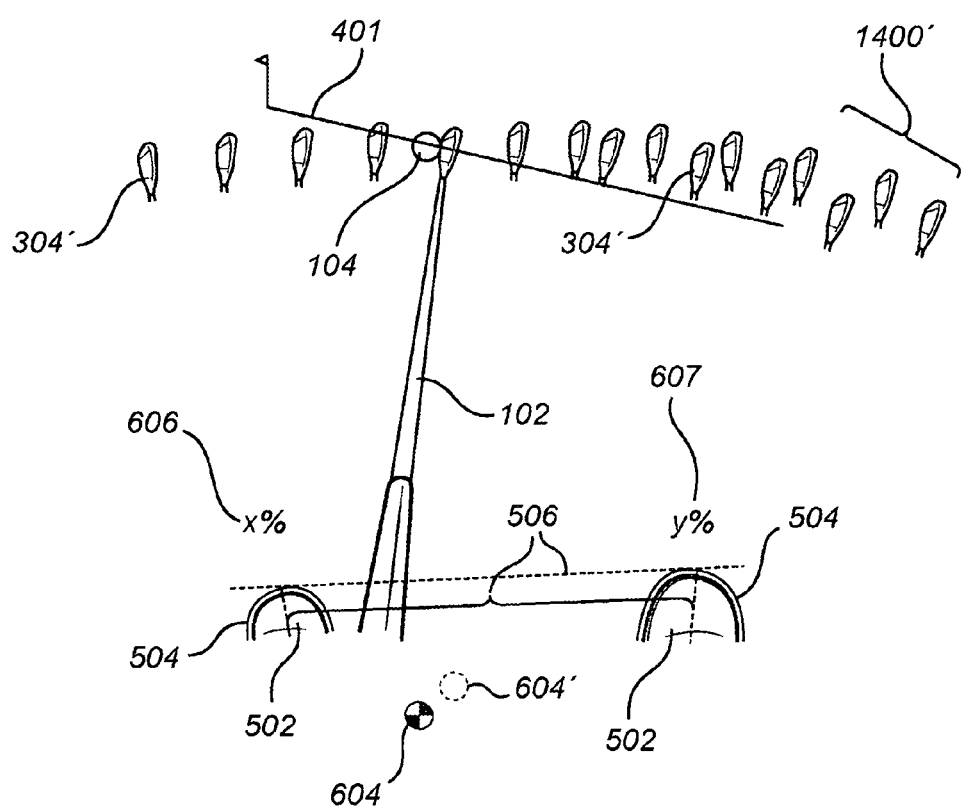
FIG. 15 schematically shows another exemplary view according to an exemplary embodiment of the invention.

FIG. 15 shows an alternative embodiment of the method where the visual guiding element 304 described earlier is replaced by a plurality of visual guiding elements 304' which shows a trajectory of a desired golf swing combined with the club face orientation at points along the swing. The plurality of visual guiding elements 304' are displayed in the optically transmissive display 105 of electronic device 100. At least a portion 1400' of the plurality of visual guiding elements 304' may show the backswing or start of the trajectory of the golf swing similar to the elongated visual guiding element portion 1400 and the visual guiding element 304 described above in conjunction with FIG. 14. Hence, the plurality of visual guiding elements 304' may be understood as a combination of the elongated visual guiding element portion 1400, the second guiding line or visual indicator 403 and the visual guiding element 304. In other words, the whole desired swing, from start to end, may be displayed with the desired club as augmented reality.

Additionally, variations to the disclosed embodiments can be understood and effected by the skilled person in practicing the claimed invention, from a study of the drawings, the disclosure, and the appended claims. For example the method steps may be performed in a different order than described herein, thus the order of the steps should not be construed as limiting the scope of the claims. Furthermore, the electronic device depicted in the description may also be in the form of electronic lenses, for example bionic contact lenses.

Moreover, the first visual guiding element may provide guidance for a trajectory of the swing of the golf club at other portions of the golf club than the head, for example at a portion of the shaft.

Of course, all the visual lines displayed in the optically transmissive display may have any desired color such as e.g. red, blue, green, black, yellow, pink, etc. Furthermore, the design of the first visual guiding element may at least partly be based on the user's measures and golf club choice.

The method steps described herein may be implemented as a computer program product comprising a computer readable medium having stored thereon computer program code for an electronic device for e.g. calculating a recommended centre of weight or recommended feet orientation, or steps according to other embodiments.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for providing guiding to a user for executing a golf swing with a golf club on a golf ball towards a target, said method being implemented in an electronic device comprising an optically transmissive display in communication with a control unit, said optically transmissive display being placed in the line-of-sight of the user, wherein said method comprises the steps of:
   identifying a location of the golf ball;
   determining a desired target direction for said golf ball;
   based on said desired target direction, determining a desired trajectory of said golf ball caused by an impact between said golf club and said golf ball; and
   displaying at least one visual guiding element in said optically transmissive display when said location of said golf ball is in the line-of-sight of the optically transmissive display,
   wherein said at least one visual guiding element is based on said desired target direction, and said desired trajectory, wherein a first visual guiding element provides guidance for a trajectory of the swing of the golf club, and a first indicator provides guidance for the golf club head orientation with respect to the golf ball at impact, wherein said first visual guiding element comprises a guiding line providing guiding for a trajectory of the swing of the golf club.

2. The method according to claim 1, wherein said first indicator is a second guiding line being displayed in said optically transmissive display, a visual indicator, an audio indicator, or a haptic indicator.

3. The method according to claim 1, wherein said guiding lines are displayed such that they are fixed in relation to said location of the golf ball.

4. The method according to claim 1, further comprising displaying a third guiding line providing an indication of the direction of the desired target.

5. The method according to claim 1, wherein said guiding lines are further determined based on predetermined data, said predetermined data being based on previously performed golf shots.

6. The method according to claim 1, further comprising providing information regarding golf club choice, wherein said guiding lines are further based on said golf club choice.

7. The method according to claim 1, further comprising providing information regarding a desired golf shot/stroke characteristic.

8. The method according to claim 1, wherein said desired trajectory of said golf ball determined by said control unit is provided from said control unit to said user based on predetermined knowledge regarding the present golf course topology stored in said control unit.

9. The method according to claim 1, wherein determining said desired target direction comprises determining a compass heading between said location and said desired target.

10. The method according to claim 1, wherein determining said desired trajectory of said golf ball comprises determining a compass heading between said location and a tangent of said desired trajectory.

11. The method according to claim 1, further comprising storing the location as a first coordinate in said control unit.

12. The method according to claim 1, further comprising displaying an artificial object in said optically transmissive display, wherein said guiding lines are further determined based on the location of said artificial object.

13. The method according to claim 1, further comprising displaying feet guiding elements for guiding the user to position his/her feet in desired positions, said feet guiding elements being based on said desired target direction, and said desired trajectory.

14. The method according to claim 1 implemented in electronic glasses or electronic lenses or an electronic visor.

15. An electronic device for providing guiding to a user for executing a golf swing with a golf club on a golf ball towards a target, said electronic device being in communication with a control unit and comprises an optically transmissive display, said optically transmissive display being placed in the line-of-sight of the user, wherein said control unit is configured to:
   identify a location of the golf ball;
   determine a desired target direction for said golf ball;
   based on said desired target direction, determining a desired trajectory of said golf ball caused by an impact between said golf club and said golf ball; and
   display at least one visual guiding element in said optically transmissive display when said location of said golf ball is in the line-of-sight of the optically transmissive display,
   wherein said at least one visual guiding element is based on said desired target direction, and said desired trajectory, wherein a first visual guiding element provides guidance for a trajectory of the swing of the golf club, and a first indicator provides guidance for the golf club head orientation with respect to the golf ball at impact, wherein said first visual guiding element comprises a guiding line providing guiding for a trajectory of the swing of the golf club.

16. The electronic device according to claim 15, wherein said control unit is a processor arranged to communicate wirelessly with said optically transmissive display.

17. An electronic device for providing guiding to a user for executing a golf swing with a golf club on a golf ball towards a target, said electronic device being in communication with a control unit and comprises a display, said display being placed in a line-of-sight of the user, wherein said control unit is configured to:
  identify a location of the golf ball;
  determine a desired target direction for said golf ball;
  based on said desired target direction, determining a desired trajectory of said golf ball caused by an impact between said golf club and said golf ball; and
  display at least one visual guiding element in said display, wherein said at least one visual guiding element is based on said desired target direction, and said desired trajectory, wherein a first visual guiding element provides guidance for a trajectory of the swing of the golf club, and a first indicator provides guidance for the golf club head orientation with respect to the golf ball at impact, wherein said first visual guiding element comprises a guiding line providing guiding for a trajectory of the swing of the golf club.

18. The electronic device according to claim 17, wherein said at least one visual guiding element is displayed when said location of said golf ball is in the line-of-sight of the display.

19. The electronic device according to claim 17, further comprising an image data acquisition device arranged to acquire a stream of images and to display said stream of images in said display.

20. The electronic device according to claim 19, wherein said at least one visual guiding element is overlaid with said stream of images.

21. A method for providing guiding to a user for executing a golf swing with a golf club on a golf ball towards a target, said method being implemented in an electronic device comprising a display in communication with a control unit, said display being placed in the line-of-sight of the user, wherein said method comprises the steps of:
  identifying a location of the golf ball;
  determining a desired target direction for said golf ball;
  based on said desired target direction, determining a desired trajectory of said golf ball caused by an impact between said golf club and said golf ball; and
  displaying at least one visual guiding element in said display,
  wherein said at least one visual guiding element is based on said desired target direction, and said desired trajectory, wherein a first visual guiding element of said at least one visual guiding element provides guidance for a trajectory of the swing of the golf club, and a first indicator provides guidance for the golf club head orientation with respect to the golf ball at impact, wherein said first visual guiding element comprises a guiding line providing guiding for a trajectory of the swing of the golf club.

22. The method according to claim 21, wherein said at least one visual guiding element is displayed when said location of said golf ball is in the line-of-sight of the display.

23. The method according to claim 22, wherein said visual guiding element is further based on said user's measures and chosen golf club.

24. The method according to claim 23, wherein said at least one visual guiding element are displayed such that they are fixed in relation to said location of the golf ball.

25. The method according to claim 22, wherein said first indicator is a second guiding line being displayed in said display, a visual indicator, an audio indicator, or a haptic indicator.

26. The method according to claim 25, wherein said guiding lines are further determined based on predetermined data, said predetermined data being based on previously performed golf shots.

27. The method according to claim 25, further comprising providing information regarding golf club choice, wherein said guiding lines are further based on said golf club choice.

28. The method according to claim 22, further comprising displaying a third guiding line providing an indication of the direction of the desired target.

29. The method according to claim 22, further comprising providing information regarding a desired golf shot/stroke characteristic.

30. The method according to claim 22, wherein said desired trajectory of said golf ball determined by said control unit is provided from said control unit to said user based on predetermined knowledge regarding the present golf course topology stored in said control unit.

31. The method according to claim 22, wherein determining said desired target direction comprises determining a compass heading between said location and said desired target.

32. The method according to claim 22, wherein determining said desired trajectory of said golf ball comprises determining a compass heading between said location and a tangent of said desired trajectory.

33. The method according to claim 22, further comprising storing the location as a first coordinate in said control unit.

34. The method according to claim 22, further comprising displaying an artificial object in said display, wherein said guiding lines are further determined based on the location of said artificial object.

35. The method according to claim 22, further comprising displaying feet guiding elements for guiding the user to position his/her feet in desired positions, said feet guiding elements being based on said desired target direction, and said desired trajectory.

36. The method according to claim 35, wherein said feet guiding elements are further based on said user's measures and a chosen golf club.

37. The method according to claim 22 implemented in electronic glasses or electronic lenses or an electronic visor.

38. The method according to claim 22, further comprising acquiring a stream of image data and displaying said stream of images in said display.

39. The method according to claim 22, comprising overlaying said at least one visual guiding element with said stream of images.

40. The method according to claim 22, further comprising displaying, in said display, a recommended weight distribution of said user's feet when said user is in a preparatory state of executing a golf swing.

41. The method according to claim 22, wherein said recommended weight distribution is based on said user's measures.

42. The method according to claim 22, further comprising displaying, in said display, a recommended centre of weight location for said user's body, and providing an indication when said user's estimated centre of weight location approximately coincides with said recommended centre of weight location.

43. The method according to claim 22, further comprising displaying, in said display, an artificial instructor, wherein said instructor executes a golf swing for providing advice to said user.

* * * * *